(12) United States Patent
Wang et al.

(10) Patent No.: US 9,266,762 B2
(45) Date of Patent: Feb. 23, 2016

(54) MEMBRANE FILTRATION PROCESS WITH HIGH WATER RECOVERY

(75) Inventors: Sijing Wang, Shanghai (CN); Yanrong Zhu, Shanghai (CN); Gaorong He, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 87 days.

(21) Appl. No.: 13/254,881

(22) PCT Filed: Sep. 30, 2010

(86) PCT No.: PCT/CN2010/001534
§ 371 (c)(1),
(2), (4) Date: Sep. 6, 2011

(87) PCT Pub. No.: WO2012/040880
PCT Pub. Date: Apr. 5, 2012

(65) Prior Publication Data
US 2013/0248445 A1    Sep. 26, 2013

(51) Int. Cl.
*B01D 61/04*     (2006.01)
*B01D 61/12*     (2006.01)
(Continued)

(52) U.S. Cl.
CPC .............. *C02F 9/00* (2013.01); *B01D 61/022* (2013.01); *B01D 61/025* (2013.01); *B01D 61/027* (2013.01); *B01D 61/04* (2013.01); *C02F 1/441* (2013.01); *C02F 1/442* (2013.01); *B01D 2311/04* (2013.01); *B01D 2311/08* (2013.01); *B01D 2311/18* (2013.01); *B01D 2311/2642* (2013.01); *B01D 2311/2661* (2013.01);
(Continued)

(58) Field of Classification Search
CPC ........ B01D 61/04; B01D 61/10; B01D 61/12; B01D 61/025; B01D 61/027; B01D 65/08; B01D 2311/02; B01D 2311/04; B01D 2311/08; B01D 2311/12; B01D 2311/103; B01D 2311/25; B01D 2311/2642; B01D 2311/2653; C02F 9/00; C02F 1/44; C02F 1/441; C02F 1/442
USPC .................. 210/639, 650, 652, 723, 737, 749
See application file for complete search history.

(56) References Cited

U.S. PATENT DOCUMENTS 2,004,694 A * 6/1935 Gillet ............................. 210/737
3,583,910 A * 6/1971 Stoddard ....................... 210/713
(Continued)

OTHER PUBLICATIONS

International Search Report in connection with PCT Application PCT/CN2010/001534 filed on Sep. 30, 2010, issued Jul. 7, 2011.

*Primary Examiner* — Katherine Zalasky
(74) *Attorney, Agent, or Firm* — GE Global Patent Operation

(57) ABSTRACT

A membrane filtration process includes pretreating an influent solution to remove suspended solids, to produce a pretreated solution. pH of the pretreated solution is adjusted to at least 8.3 or lower by injecting $CO_2$ into the pretreated solution, to produce a conditioned solution. Injecting $CO_2$ also serves to supplement bicarbonate in the conditioned solution. The conditioned solution is flowed through a membrane filtration unit, to produce a permeate solution and a retentate solution. The membrane filtration unit comprises reverse osmosis membranes or nanofiltration membranes, or both. The retentate solution is then treated to cause precipitation, to produce a supernatant solution and a reject solution. At least a portion of the supernatant solution is recirculated by combining it with the influent solution prior to the step of pretreating.

17 Claims, 2 Drawing Sheets

Figure 1:
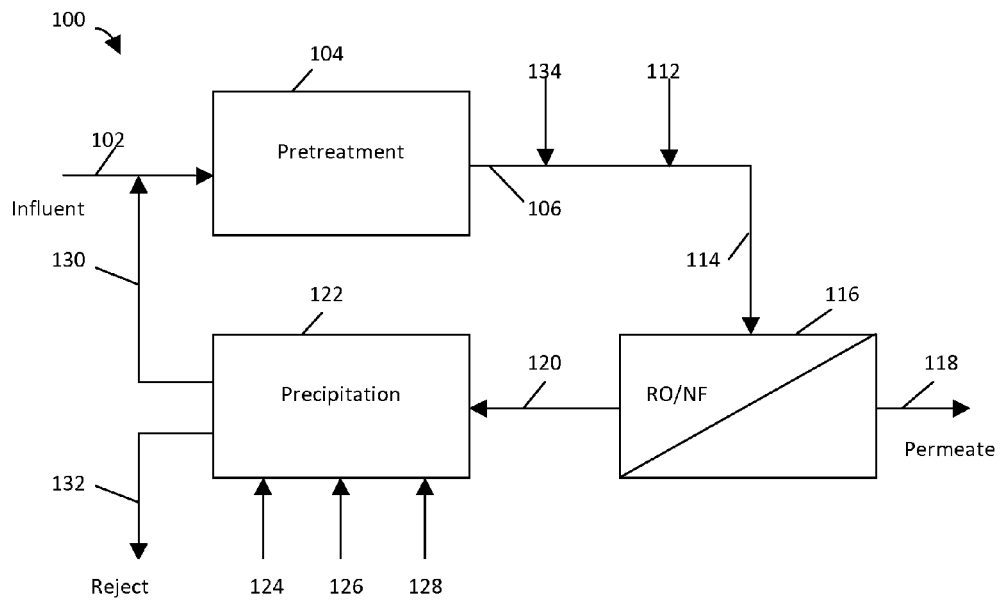

(51) Int. Cl.
*C02F 1/44* (2006.01)
*C02F 9/00* (2006.01)
*B01D 61/02* (2006.01)
*B01D 61/10* (2006.01)
*C02F 1/52* (2006.01)
*C02F 1/54* (2006.01)
*C02F 1/56* (2006.01)
*C02F 1/66* (2006.01)
*C02F 5/08* (2006.01)

(52) U.S. Cl.
CPC .............. *B01D2317/04* (2013.01); *C02F 1/444* (2013.01); *C02F 1/5236* (2013.01); *C02F 1/54* (2013.01); *C02F 1/56* (2013.01); *C02F 1/66* (2013.01); *C02F 5/08* (2013.01)

(56) References Cited

U.S. PATENT DOCUMENTS

| | | | |
|---|---|---|---|
| 4,495,031 A | | 1/1985 | Breidenbach et al. |
| 5,501,798 A | | 3/1996 | Al-Samadi et al. |
| 5,522,995 A | * | 6/1996 | Cockrem ................... 210/637 |
| 5,783,084 A | | 7/1998 | Suenkonis |
| 5,925,255 A | | 7/1999 | Mukhopadhyay |
| 5,997,745 A | | 12/1999 | Tonelli et al. |
| 6,054,050 A | | 4/2000 | Dyke |
| 6,113,797 A | | 9/2000 | Al-Samadi |
| 6,461,514 B1 | | 10/2002 | Al-Samadi |
| 6,537,456 B2 | | 3/2003 | Mukhopadhyay |
| 6,821,439 B1 | | 11/2004 | Currier |
| 2008/0135479 A1 | * | 6/2008 | Jensen et al. ............... 210/638 |

* cited by examiner

MEMBRANE FILTRATION PROCESS WITH HIGH WATER RECOVERY

FIELD

This specification relates to reverse osmosis and nanofiltration processes for water purification.

BACKGROUND

The following background discussion is not an admission that anything discussed below is citable as prior art or common general knowledge.

High efficiency reverse osmosis processes ("HERO"; see, for example, U.S. Pat. Nos. 5,925,255 and 6,537,456) can achieve higher water recovery rates compared to conventional reverse osmosis processes. HERO relies on a series of pretreatment steps prior to reverse osmosis filtration, which includes use of weak acid cation resin columns, degasification and pH adjustment.

Other processes may involve the use of microfiltration, ultrafiltration, ion exchange and chemical precipitation to achieve greater water recovery (see, for example, U.S. Pat. Nos. 5,501,798, 6,113,797 and 6,461,514).

INTRODUCTION

The following discussion is intended to introduce the reader to the more detailed discussion to follow, and not to limit or define any claim.

Reverse osmosis and nanofiltration are filtration methods that can be used to purify water by removing or reducing total dissolved solids (TDS) and residual organic compounds from various water sources, such as from natural water sources, municipal water supply or industrial effluents. Reverse osmosis (RO) relies on a diffusive mechanism to separate relatively large molecules and ions from a solution by applying pressure to the solution on one side of a semipermeable membrane. Nanofiltration (NF) is typically a cross-flow filtration technology which ranges somewhere between ultrafiltration (UF) and reverse osmosis. The filtration process takes place on a selective separation layer formed by a semipermeable membrane. Both reverse osmosis and nanofiltration are a pressure driven separation process. The driving force of the separation process is the pressure difference between the feed (retentate) and the filtrate (permeate) side at the separation layer of the membrane.

In reverse osmosis and nanofiltration processes, efficiency and water recovery is often limited by mineral scale formation from hardness compounds, such as calcium, magnesium, barium, iron, fluoride, sulfate, carbonate and silica or silicate salts on membrane surfaces. Residual organic compounds and biological proliferation can also cause membrane fouling. In a conventional RO or NF water purification process, the water recovery rate (referring to the percentage of the permeate recovery from the feed water) is often limited to the range of 65-80%, depending on the influent water quality. As such, a large amount of the membrane concentrate (or "reject") has to be further treated or disposed of at a high cost.

Described herein, a membrane filtration process includes first pretreating an influent solution using a method effective to remove suspended solids, such as ultrafiltration, microfiltration or multimedia filtration, to produce a pretreated solution. Next, pH of the pretreated solution is adjusted to at least 8.3 or lower by injecting $CO_2$ into the pretreated solution, to produce a conditioned solution. In addition to adjusting pH of the pretreated solution, injection of $CO_2$ also serves to increase bicarbonate concentration in the conditioned solution. The conditioned solution is flowed through a membrane filtration unit, to produce a permeate solution and a retentate solution. The membrane filtration unit comprises reverse osmosis or nanofiltration membranes. The retentate solution is then treated in a precipitation clarifier to cause precipitation of solids, to produce a supernatant solution and a reject solution. At least a portion of the supernatant solution is recirculated by combining it with the influent solution prior to the step of pretreating.

The conditioning and precipitation steps provide for the removal of hardness and silica-related fouling components; some portion of organic compounds can also be removed during precipitation in the precipitation clarifier. The process can increase water recovery rate for reverse osmosis and nanofiltration processes.

DRAWINGS

Figure 2:
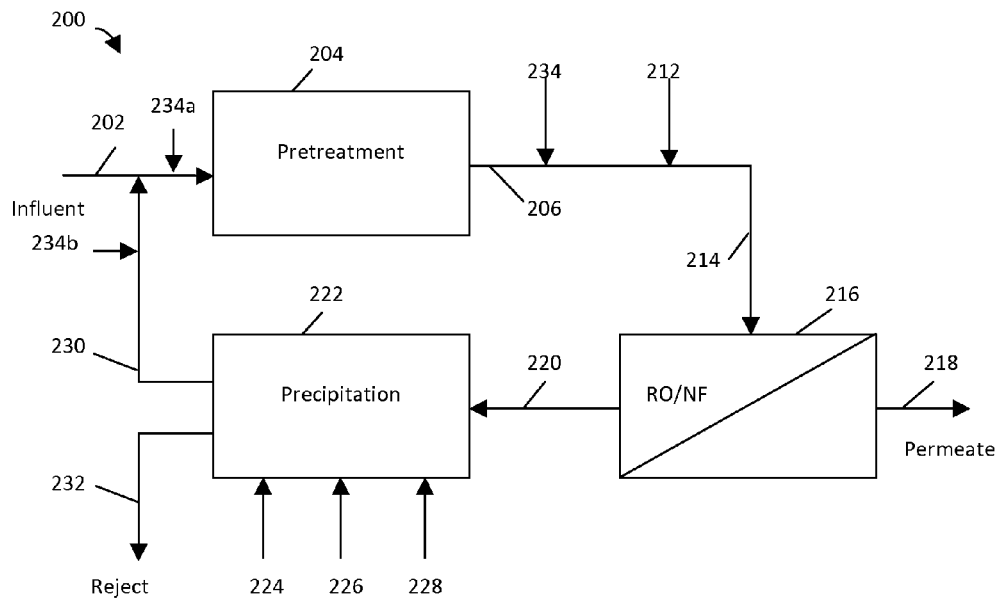
Figure 3:
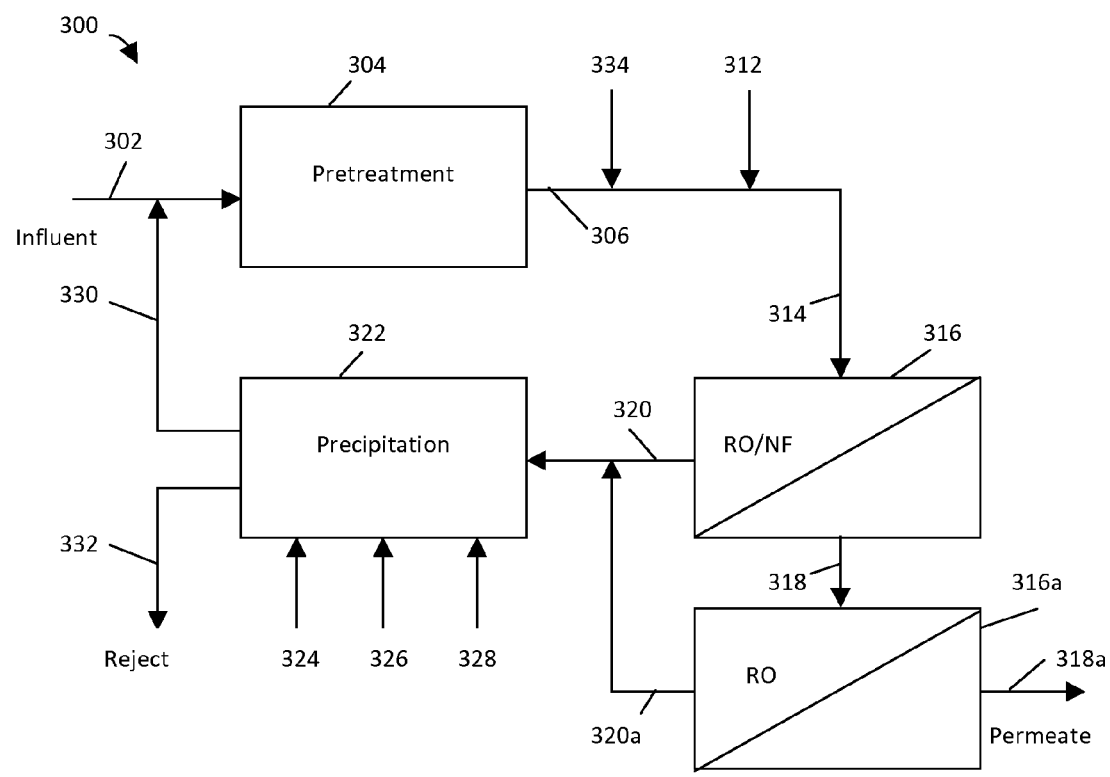

FIGS. 1 to 3 are schematic views of examples of filtration apparatuses.

For simplicity and clarity of illustration, where considered appropriate, reference numerals may be repeated among the drawings to indicate corresponding or analogous elements.

DETAILED DESCRIPTION

Referring to FIG. 1, an example of a filtration apparatus is shown generally at 100. The filtration apparatus 100 includes an influent solution 102. The influent solution 102 is introduced to a pretreatment chamber 104. The pretreatment chamber 104 includes suitable means effective to remove suspended solids from the influent solution 102, using ultrafiltration, microfiltration or multimedia filtration, for example.

After pretreatment, pH of the pretreated solution 106 is adjusted to at least about 8.3 or lower by injecting $CO_2$ 134. Optionally, an anti-scalant agent 112 can be added to prevent membrane scaling. Examples of anti-scalant agents include polyacrylic acids, hydrolyzed polymaleic anhydride, acrylic or maleic acid based copolymer and terpolymer, and metal sequestering agents such as ethylenediaminetetraacetic acid (EDTA), sodium hexametaphosphate (SHMP), 1-hydroxyethylidene-1,1-diphosphonic (HEDP), and 2-phosphonobutane-1,2,4-tricarboxylic acid (PBTC).

After conditioning, a conditioned solution 114 flows to a membrane filtration unit 116. The membrane filtration unit 116 includes either reverse osmosis (RO) or nanofiltration (NF) filtration membranes, or both. The membrane filtration unit 116 produces a high purity permeate solution 118, and a retentate solution 120.

The retentate solution 120 is introduced to a precipitation clarifier 122 and is treated to cause precipitation of solids. In the precipitation clarifier 122, pH of the retentate solution 120 can be increased to between about 9.5 and 12.0, or between about 10.0 and 11.5. The pH can be adjusted by adding an alkali 124, for example, sodium hydroxide or lime. Furthermore, a precipitation seed agent 126, such as $CaCO_3$ and $CaSO_4$ powders or slurry, can be added initially to act as crystallization nuclei to speed up precipitation within the precipitation clarifier 122.

Optionally, a coagulant agent and/or flocculant agent 128 can be added, to speed up solid-liquid separation within the precipitation clarifier 122. In the precipitation clarifier 122, once the precipitant "seed" is formed, the removal of suspended solids can be enhanced through the use of coagulant and/or flocculant. Coagulation and flocculation are mechanisms that are used to chemically increase particle size to enhance precipitation. Coagulation is charge neutralization by positively-charged coagulant. Both inorganic and polymer based coagulants can be used to build particle size by neutralizing the negative surface charges on particles via double layer compression and electrostatic attraction. Flocculation is a physical bridging mechanism that relies primarily on the size of the flocculant molecule more than its charge. Although cationic flocculants may be used, anionic charged flocculants are preferable because pH in the precipitation clarifier 122 is highly alkaline and there is an affinity between inorganic solids and anionic flocculants.

Precipitation in the precipitation clarifier 122 can provide for the removal of significant hardness and silica related fouling components. For example, at a pH of 10.0 to 11.5 and with coprecipitation in the precipitation clarifier 122, ions including barium, iron, manganese, magnesium, aluminum can be removed to a relatively very low level, calcium can be removed in a form such as calcium carbonate and calcium sulfate, and a significant portion of silica or silicate salts can be removed by forming Si—Ca—Mg complex precipitates. Increasing temperature by heating or steam injection can further enhance silica removal in the precipitation clarifier 122.

The precipitation clarifier 122 produces a supernatant solution 130 and a reject solution 132. The reject solution 132 can be drained, either periodically or continuously, from a lower part of the precipitation clarifier 122 where precipitated solids accumulate.

At least a portion of a supernatant solution 130 from the precipitation clarifier 122 is recirculated by combining the supernatant solution 130 with the influent solution 102, prior to the step of pretreating in the pretreatment chamber 104.

In addition to adjusting pH of the pretreated solution 106, the $CO_2$ injection 134 also serves to increase bicarbonate concentration in the conditioned solution 114 prior to flowing to the membrane filtration unit 116, which will enhance the precipitation of calcium in the retentate solution 120 downstream once pH is increased to between about 9.5 and 12.0, or between about 10.0 and 11.5, in the precipitation clarifier 122.

There are other advantages to using $CO_2$ injection for reducing scaling on membrane surfaces compared to use of sulfuric or hydrochloric acids, for example. $CO_2$ is generally not corrosive to pipes and equipment, and it is not stored as an acid solution. $CO_2$ injection serves as two purposes: adjust pH and provide bicarbonate for subsequent hardness removal in the precipitation clarifier. $CO_2$ is also more cost effective and environmentally friendly compared to use of acid to decrease pH, and then supplementing sodium carbonate to the precipitation clarifier 122.

The filtration apparatus 100 can include further components, which have been omitted from FIG. 1. For example, one or more pumps can be provided upstream of the membrane filtration unit 116 to pressurize the conditioned solution 114, and/or a heat exchanger can be provided upstream of the precipitation clarifier 122 to increase the temperature of the retentate solution 120 before introduction to the precipitation clarifier 122.

Using the filtration apparatus 100, water recovery rate can be increased in comparison to a conventional arrangement in which there is no recirculation. For illustration purposes, if reverse osmosis water recovery rate is Yp, the reverse osmosis reject ratio is $Y_R$, the drain ratio is $Y_D$, and the supernatant recirculation ratio is R (and the reject portion of pretreatment chamber 104 is ignored), then:

$$Y_P = 100\% - Y_D \quad (1)$$

$$R = Y_R - Y_D \quad (2)$$

For normal RO water purification process, there is no recirculation (R=O), so the water recovery rate is $$Y_P = 100\% - Y_R \quad (3)$$

If the reverse osmosis reject ratio is 20%, then the water recovery rate is 80%. However, using the filtration apparatus 100, as there is solid-liquid separation in the precipitation clarifier 122, the supernatant solution 130 is recirculated back to the pretreatment chamber 104. Suppose the reverse osmosis reject ratio is 20%, and the supernatant recirculation ratio R is 10%, then according to equation (3) the water recovery rate $Y_P$ will be 90%. This ratio can be further increased if hardness removal in the precipitation clarifier 122 is efficient. Thus, as an approximation, a process using the filtration apparatus 100 can increase the water recovery rates from about 65-80% for a conventional filtration process to about 90-95%. The increase in water recovery also reduces costs associated with disposal of the reject solution.

Referring to FIG. 2, another example of a filtration apparatus is shown generally at 200. The filtration apparatus 200 is similar to the filtration apparatus 100. However, prior to being introduced to the pretreatment chamber 204, the influent solution 202 can be injected with $CO_2$ 234a to decrease pH of the influent solution 202 prior to pretreatment. Furthermore, the supernatant solution 230 can be injected with $CO_2$ 234b to decrease pH of the supernatant solution 230 prior to combining the supernatant solution 230 with the influent solution 202. By decreasing the pH, remaining particles in the supernatant solution 230 are dissolved before being combined with the influent solution 202.

Referring to FIG. 3, another example of a filtration apparatus is shown generally at 300. The filtration apparatus 300 is similar to the filtration apparatuses 100 and 200. However, the filtration apparatus 300 is a "two-pass" system, in which permeate solution 318 is flowed to a secondary membrane filtration unit 316a. The secondary membrane filtration unit 316a produces a high purity secondary permeate solution 318a, and a secondary retentate solution 320a. At least a portion of the secondary retentate solution 320a is combined with the retentate solution 320 prior to being introduced to the precipitation clarifier 322.

In some examples of this "two-pass" arrangement, the membrane filtration unit 316 can comprise NF membranes, followed by the membrane filtration unit 316a, which can comprise RO membranes. In other examples, the membrane filtration units 316, 316a can each comprise RO membranes.

Generally, the membrane filtration units 116, 216, 316, 316a can each comprise one or more RO or NF membrane modules, arranged in parallel or in series. For example, the membrane filtration unit 116, 216, 316, 316a can comprise two-stage or multi-stage reverse osmosis filtration modules.

Selection of $CO_2$ injection points and pH control parameters can significantly influence cost effectiveness of the filtration process. In an open atmosphere system, it may not be economical to decrease pH to below 8.0 prior to RO/NF filtration in the membrane filtration unit 116, 216, 316, as a portion of injected $CO_2$ can escape to the atmosphere. However, if $CO_2$ is added in a closed system under pressure, the pressure will force the following equation towards the right, allowing the pH to drop to a desired level.

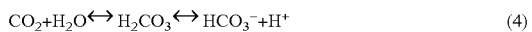

$$CO_2 + H_2O \leftrightarrow H_2CO_3 \leftrightarrow HCO_3^- + H^+ \quad (4)$$

Thus, if the pretreatment chamber 104, 204, 304 is designed as an open system (e.g., immersed MF/UF), $CO_2$ can be injected to decrease pH to around 8.0 to 8.5 prior to entering the pretreatment chamber 104, 204, 304 (e.g., $CO_2$ 234a).

Further, as described above, $CO_2$ can be injected to closed piping between the pretreatment chamber 104, 204, 304 and the membrane filtration unit 116, 216, 316 at 134, 234, 334 to decrease pH and simultaneously also supplement sufficient carbonate/bicarbonate for subsequent precipitation of calcium in the precipitation clarifier 122, 222, 322. Thus, in the retentate solution 120, 220 320, bicarbonate will be dominant as shown in following equation:

$$CO_2 + H_2O \leftrightarrow H_2CO_3 \leftrightarrow HCO_3^- + H^+ \quad (5)$$

As described above, the retentate solution 120, 220 320 is directed to the precipitation clarifier 122, 222, 322 for hardness and silica removal. It can be more efficient and desirable to convert as much bicarbonate to carbonate as possible, by way of heating or decreasing pressure, or both, prior to using an alkali to increase pH in the precipitation clarifier 122, 222, 322.

$$HCO_3^- + heat \leftrightarrow CO_3^{2+} + CO_2 + H_2O \quad (6)$$

As shown in equation (6), heat forces bicarbonate to produce carbonate and $CO_2$. Pressure of the retentate solution 120, 220 320 can drop substantially as it flows from the membrane filtration unit 116, 216, 316 to the precipitation clarifier 122, 222, 322, and thus $CO_2$ can be evaporated/volatized. Conversion of bicarbonate to carbonate, by either heating or pressure drop, or by both, can reduce the requirement of dosing with alkali to increase pH for precipitation. The volatized $CO_2$ can also be collected and recycled for $CO_2$ injection as described above.

The teachings herein may be suitable either for new water purification installations or retrofit of existing reverse osmosis and nanofiltration operations.

We claim:

1. A membrane filtration process, comprising:
   pretreating an influent solution to remove suspended solids, to produce a pretreated solution;
   reducing pH of the pretreated solution from above 8.3 to 8.3 or lower by injecting $CO_2$ into the pretreated solution, to produce a conditioned solution containing an increased concentration of bicarbonate relative to the pretreated solution;
   flowing the conditioned solution through a reverse osmosis or nanofiltration membrane filtration unit, to produce a permeate solution and a retentate solution;
   collecting the permeate solution;
   treating the retentate solution to cause precipitation of solids, to produce a supernatant solution and a reject solution, wherein the treating comprises (i) a step to convert bicarbonate to carbonate selected from the group consisting of a) heating the retentate solution, (b) reducing pressure of the retentate solution, and (c) heating, and reducing pressure of, the retentate solution and (ii) adding an alkali to the retentate solution after step (i); and
   recirculating at least a portion of the supernatant solution by combining the portion of the supernatant solution with the influent solution prior to the step of pretreating.

2. The process of claim 1, further comprising, prior to the step of pretreating, injecting $CO_2$ into the influent solution.

3. The process of claim 2, wherein injecting $CO_2$ into the influent solution causes an increase in bicarbonate concentration.

4. The process of claim 1, further comprising, prior to the step of flowing, adding an anti-scaling agent to the conditioned solution.

5. The process of claim 1 wherein the step of treating comprises adjusting pH of the retentate solution to between 9.5 and 12.0.

6. The process of claim 1, wherein the step of treating comprises adjusting pH of the retentate solution to between 10.0 and 11.5.

7. The process of claim 1, wherein, in the step of treating, the retentate solution is treated in a precipitation clarifier.

8. The process of claim 7, wherein the step of treating comprises adding an alkali to the retentate solution in the precipitation clarifier.

9. The process of claim 7, wherein the step of treating comprises adding a precipitation seed agent to the retentate solution in the precipitation clarifier.

10. The process of claim 7, wherein the step of treating comprises adding a coagulant agent to the retentate solution in the precipitation clarifier.

11. The process of claim 7, wherein the step of treating comprises adding a flocculant agent to the retentate solution in the precipitation clarifier.

12. The process of claim 1 wherein the step of treating comprises heating the retentate solution.

13. The process of claim 1, wherein the step of treating comprises reducing pressure of the retentate solution.

14. The process of claim 1, wherein the step of treating comprises collecting $CO_2$.

15. The process of claim 14, further comprising injecting the collected $CO_2$ into the pretreated solution, the influent solution, or the portion of the supernatant solution.

16. The process of claim 1, wherein the step of pretreating comprises using microfiltration, ultrafiltration or multi-media filtration.

17. The process of claim 1, further comprising:
   flowing the permeate solution through a secondary reverse osmosis membrane filtration unit, to produce a secondary permeate solution and a secondary retentate solution;
   collecting the secondary permeate solution; and
   recirculating at least a portion of the secondary retentate solution by combining the portion of the secondary retentate solution with the retentate solution prior to step of treating.

* * * * *